United States Patent
Miyamoto

(10) Patent No.: US 7,125,059 B2
(45) Date of Patent: Oct. 24, 2006

(54) HAND DEVICE FOR WORKING ROBOT

(75) Inventor: Toshio Miyamoto, Kariya (JP)

(73) Assignee: Yutaka Electronics Industry Co., Ltd., Aichi-Ken (JP)

(*) Notice: Subject to any disclaimer, the term of this patent is extended or adjusted under 35 U.S.C. 154(b) by 5 days.

(21) Appl. No.: 10/798,952

(22) Filed: Mar. 12, 2004

(65) Prior Publication Data

US 2004/0207222 A1      Oct. 21, 2004

(30) Foreign Application Priority Data

Mar. 14, 2003   (JP) .............................. 2003-070749

(51) Int. Cl.
*B66C 1/00*   (2006.01)
(52) U.S. Cl. .......................... 294/106; 294/88; 901/37; 901/49
(58) Field of Classification Search ................. 294/88, 294/115, 106; 901/37, 49, 50
See application file for complete search history.

(56) References Cited

U.S. PATENT DOCUMENTS 4,304,433 A * 12/1981 Langowski ................. 294/106
4,348,044 A *  9/1982 Wood, III ..................... 294/88

FOREIGN PATENT DOCUMENTS

| JP | 05-285876 | 11/1993 |
| JP | 06-114778 | 4/1994 |
| JP | 09/124267 | 5/1997 |

* cited by examiner

Primary Examiner—Eileen D. Lillis
Assistant Examiner—Esther Onyinyechi Okezie
(74) Attorney, Agent, or Firm—Arent Fox PLLC

(57) ABSTRACT

A hand device for working robot which can be downsized is provided. The device consists of a robot hand 10, a link means 40 and a workpiece drop prevention means. The robot hand 10 includes a hand base 20, a pair of fingers 21, 21 protruding from the hand base 20 and a movable core 25 provided with a cylinder 24. The link means 40 includes a lever and a connecting pad 43 for connecting the lever and the movable core 25. A workpiece drop prevention means 60 includes a protrusion stick 50 which is supported by a supporting rail 51, a coil spring and an air cylinder for recess 53.

6 Claims, 5 Drawing Sheets

A-A

HAND DEVICE FOR WORKING ROBOT

This application claims the benefit of Japanese Patent Application Number 2003-070749 filed Mar. 14, 2003, the entirety of which is incorporated by reference.

BACKGROUND OF THE INVENTION

1. Field of the Invention

The present invention relates to a hand device of a working robot for gripping a workpiece, and particularly, the hand device which includes a workpiece drop prevention means which operates in an emergency or the like, such as an electric power failure.

2. Description of Related Art

Conventionally, a hand device for working robot is known which comprises a workpiece drop prevention means for preventing a workpiece from dropping by maintaining a gripping state so as not to drop or displace the workpiece even if an electric power failure and a malfunction or a disorder of a driving system occurs while the workpiece is delivered or reversed. As one of such apparatus, for example, Japanese Patent publication of unexamined application No. 06-114778 discloses a workpiece drop prevention means of a robot hand comprising a chuck arm for gripping a workpiece from both lateral sides using the linear movement along a guide member, a chuck cylinder for driving the gripping movement of the chuck arm, a rail for lock having one end connected to the guide member and the other end connected to an eccentric cam, and a lock cylinder for locking the rail for lock by a rotation of the eccentric cam for lock in order to prevent the rail for lock from moving to the outside.

Under the condition that the hand is gripping a workpiece, the major axis of the eccentric cam rotates in the direction of the rail for lock by means of the lock cylinder, so that the periphery of the major axis attaches to the rail for lock to engage with the same. Thus, in this robot hand, even in an emergency where the gripping force of the chuck arm is decreased by a chuck cylinder, a movement of the chuck cylinder to open outward makes the rotating diameter of the eccentric cam larger. Whereby, a locking state is strengthened to stop the chuck cylinder, so that a workpiece can be prevented from dropping.

However, in a robot hand in the above, as the periphery of the major axis and the rail for lock are engaged every time a workpiece is gripped, a dent or a scar easily occurs at a portion where the periphery and the rail attach each other. As a result, the length of the major axis of the eccentric cam which is a diameter of rotation comes inconsistent. This causes a change of a rotating torque that is pressing force applied to the attaching portions. Under such circumstances, a controlling means for fine adjustment of an elasticity of the lock cylinder is needed in order to keep the pressing force of the eccentric cam applied to the rail for lock within a desirable value. Thus, a configuration of the workpiece drop prevention means becomes complicated.

Further, with this robot hand, a workpiece is gripped by a linear movement of a chuck arm along the guide member. Thus, the length of the guide member should be secured to be longer than the width of grip portion of the workpiece, which makes it impossible to downsize the guide member less than the width of the grip portion of the workpiece. Moreover, since an eccentric cam and a rail for lock are engaged by friction, the chuck arm could not always be stopped due to a stain on an attaching portion or abrasion during the elapsed time. Therefore, there is a problem that the reliability of a workpiece drop-prevention function could be lowered.

Considering the above problems, the object of the present invention is to provide a hand device for working robot which can be downsized including a workpiece drop prevention means with a simple configuration and further enabling to improve reliability of a workpiece drop preventing function.

SUMMARY OF THE INVENTION

According to a first aspect of the present invention, there is provided a hand device for working robot comprising a grip capable of gripping or releasing a workpiece, a movable body provided on a driving base so as to extend or retract by a driving means, a link means for linking an extending or retracting movement of the movable body with a gripping or releasing movement of the grip, and a workpiece drop prevention means for preventing a workpiece from dropping by attaching to the movable body and stopping the releasing movement of the grip when the driving means is stopped. The workpiece drop prevention means further comprises a protrusion stick with a tapered tip, a support rail supporting the protrusion stick so that the protrusion stick can slide between a protrusion position where the protrusion stick abuts on the movable body and a recess position, a momentum means for pushing the protrusion stick supported by the support rail at the protrusion position, and a holding means for holding the protrusion stick at the recess position resisting against the pushing of the momentum means in a normal state and releasing the protrusion stick when the driving means is stopped operating. Here, "when a driving means is stopped operating" includes not only the time when a performance of the driving means totally stops, but the time when a performance of the driving means is lowering before a complete stop thereof.

According to a second aspect of the present invention, there is provided a hand device for working robot, wherein the holding means controls gripping and releasing the protrusion stick by the driving means of the movable body.

According to a third aspect of the present invention, there is provided a hand device for working robot, wherein the grip has at least a pair of fingers mounted pivotally on the gripping base. Here, movement of gripping and releasing the workpiece are performed from both lateral sides of the workpiece by rotating the fingers around a pivot axis.

According to a fourth aspect of the present invention, there is provided a hand device for working robot, wherein the link means includes a lever protruding from the base of the fingers and a connecting pad for connecting the lever and the movable body. Then an extending and retracting movement of the movable body is linked with a rotating movement of the fingers.

DETAILED DESCRIPTION OF THE PREFERRED EMBODIMENTS

An embodiment of the present invention will be described below based on figures. FIGS. 1–5 shows an embodiment of a hand device for working robot hand (hereinafter, simply referred to as a robot hand) according to the present invention. A robot hand 10 is preferably used as an element of a working robot which is configured for corresponding to operations, for example, taking out a workpiece W from a frame which is formed by a forming machine, such as a die cast machine, to transfer the same to a certain position of the next process, and inverting the workpiece W. In these operations, the robot hand functions as gripping device for gripping the workpiece W.

Figure 1:
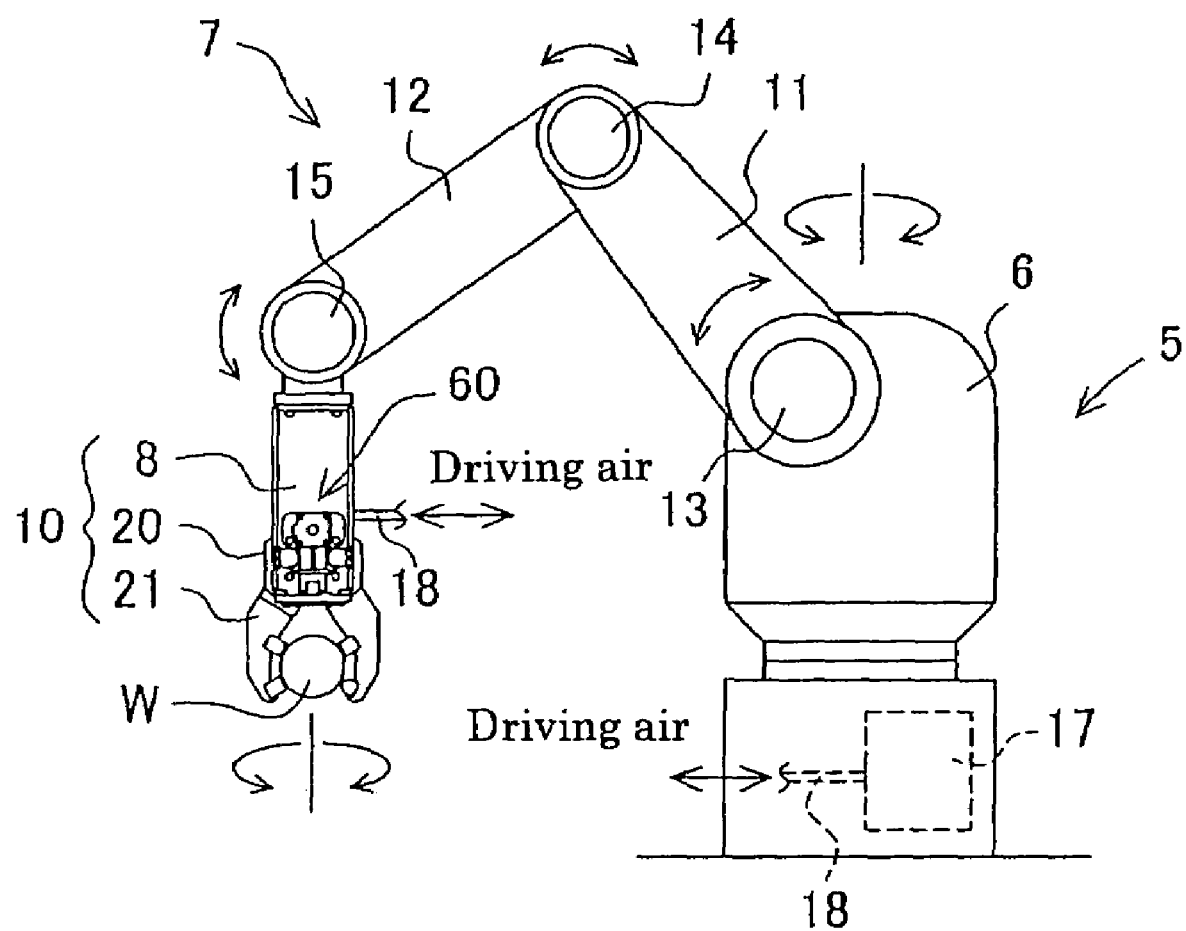
FIG. 1 is a schematic view of a working robot having a workpiece gripping device according to the present invention.
Figure 2:
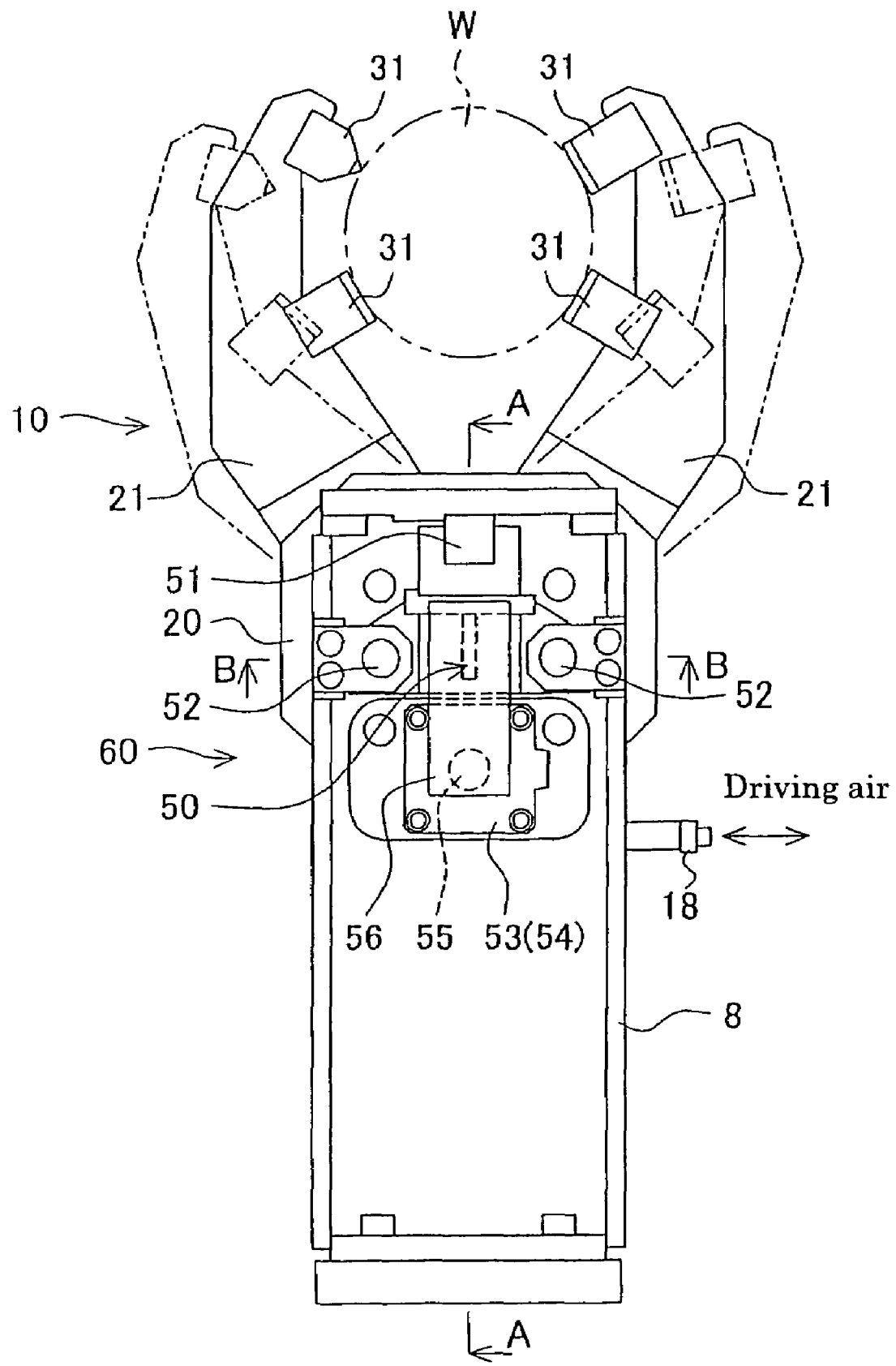
FIG. 2 is a front view of a workpiece gripping device.
Figure 3:
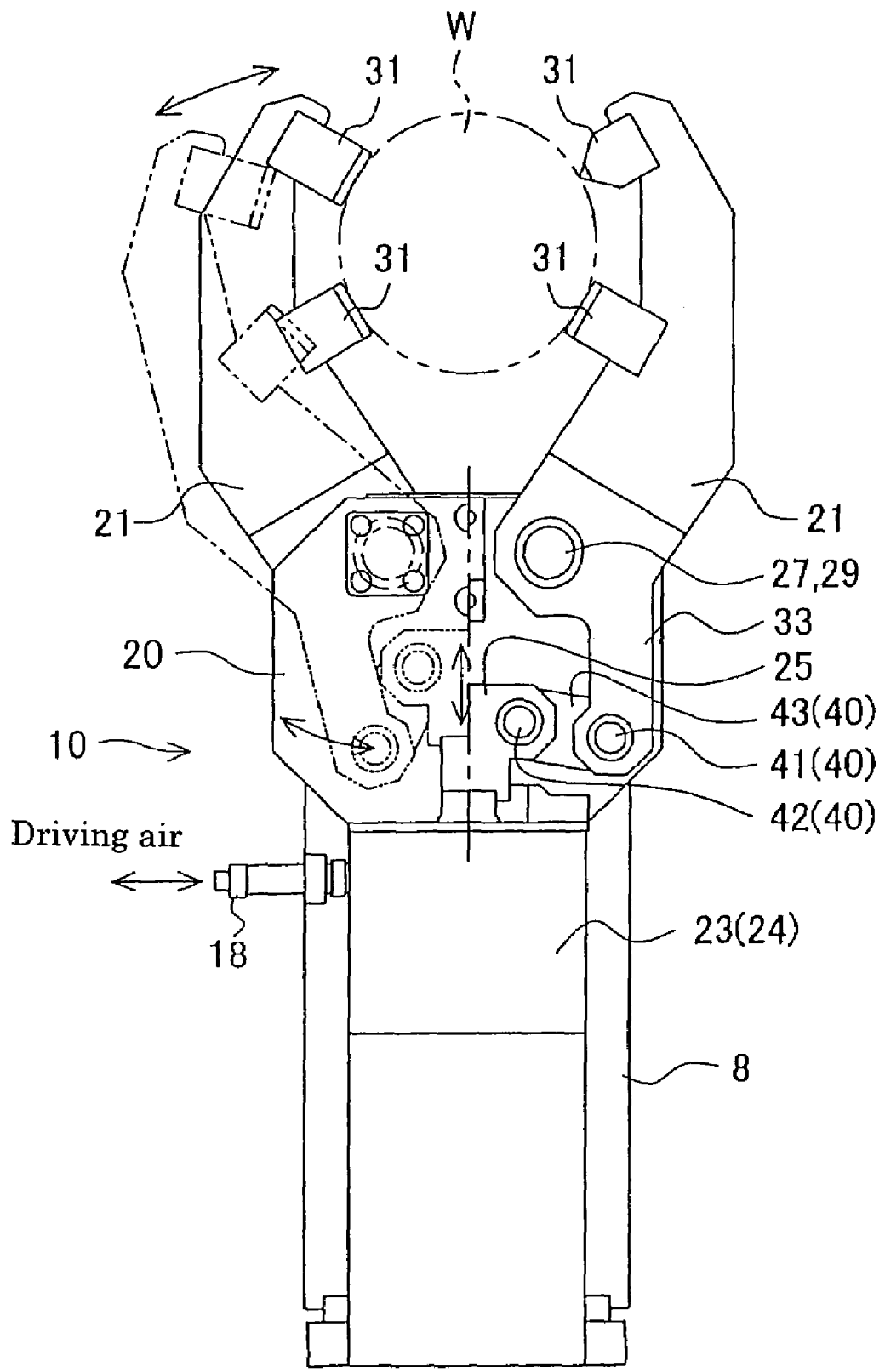
FIG. 3 is a back view of a link means of a workpiece gripping device, which includes a partially cutaway sectional view.
Figure 4:
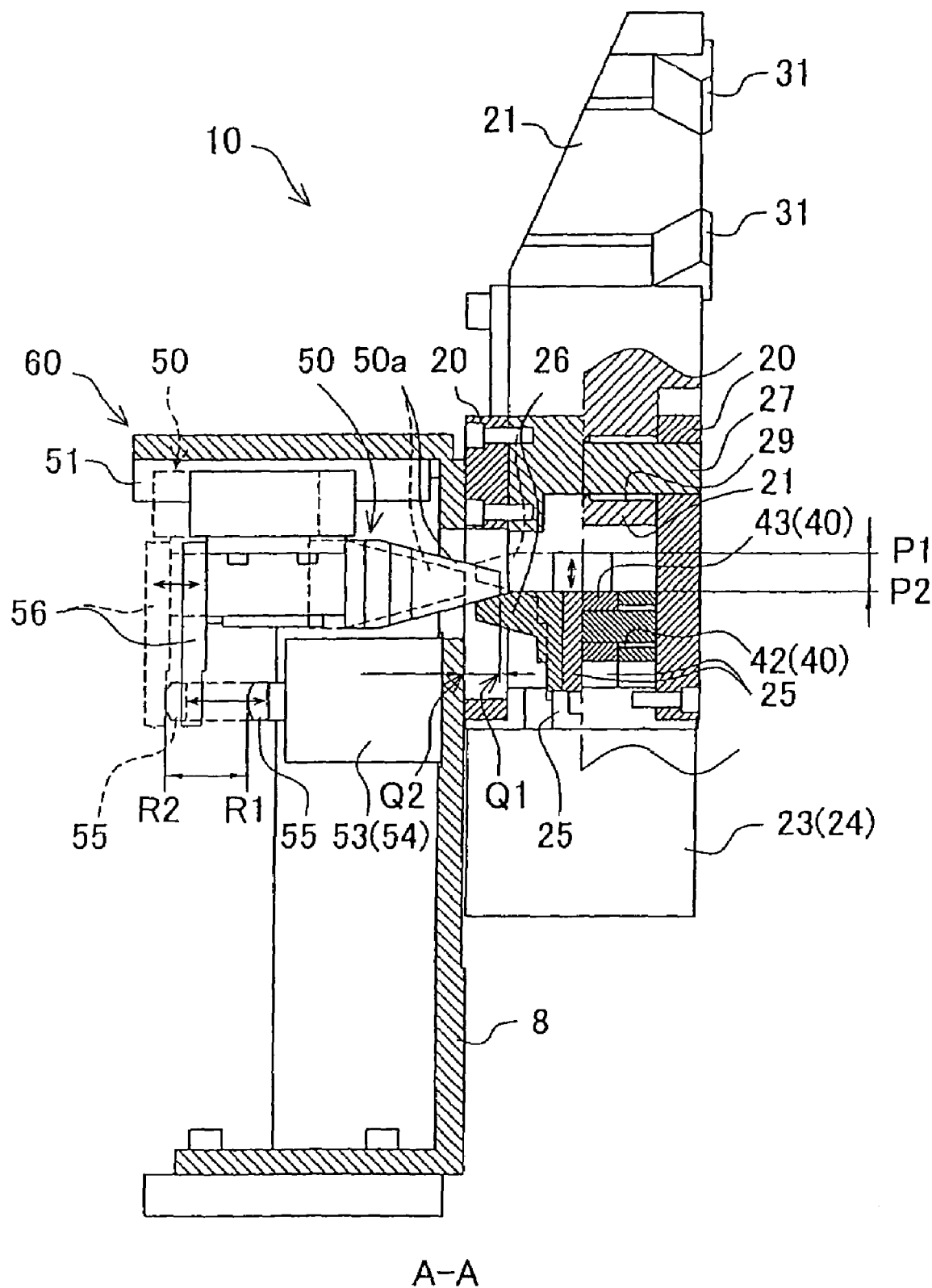
FIG. 4 shows a cross-sectional view taken along a line A—A in FIG. 2.
Figure 5:
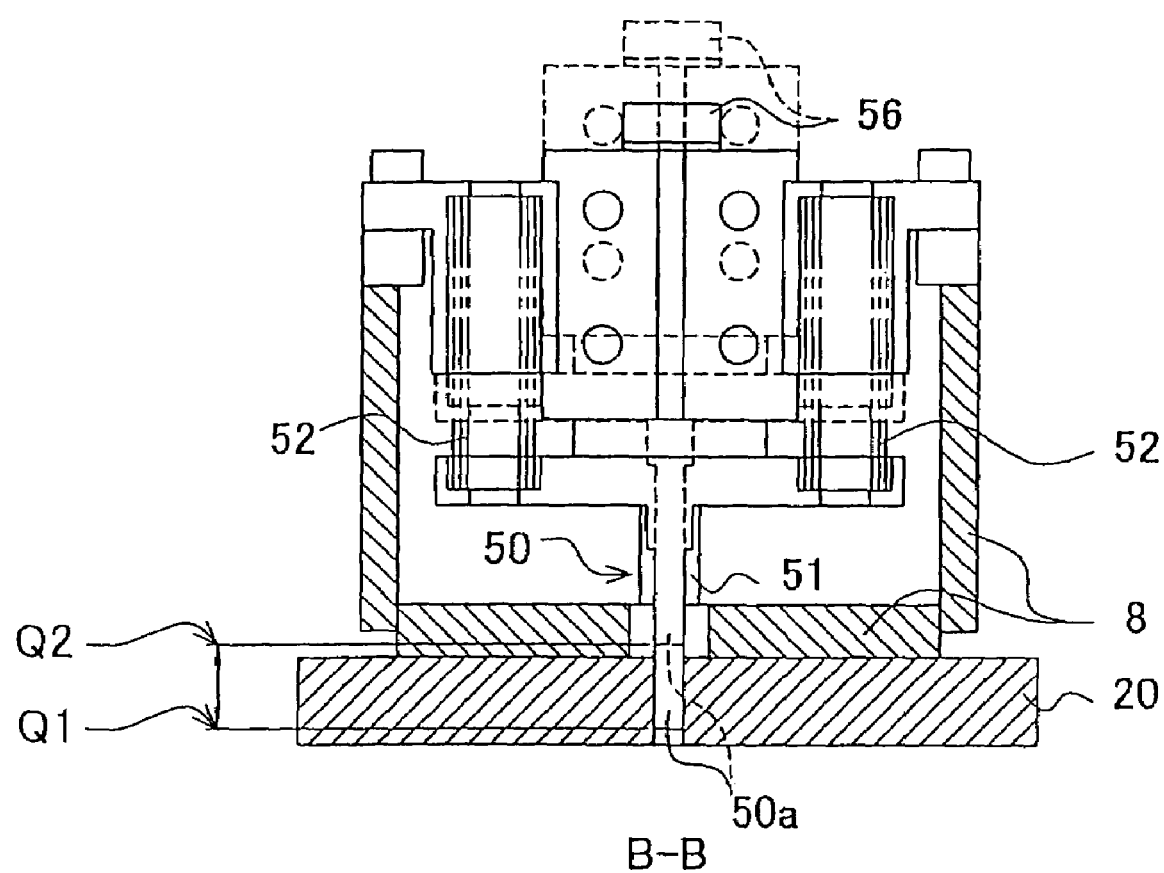
FIG. 5 shows a major part sectional view taken along a line B—B in FIG. 2, especially for showing a workpiece drop prevention means.

Referring to FIG. 1, a working robot 5 includes a base 6 provided so as to rotate horizontally and a movable arm 7 which is articulated and protruding from the top of the base 6. A robot hand 10 is provided at the top of the movable arm 7. The base 6 houses an air pump 17 which is connected to the robot hand 10 through a supply tube 18 which is foldable. The air pump 17 is configured so as to supply driving air to the robot hand 10.

The movable arm 7 is consisted of a first arm portion 11 and a second arm portion 12. The first arm portion 11 has a bottom end connected to the base 6 with a first joint 13 so that the first arm portion can swing in a vertical direction with the first joint 13 as a fulcrum. A top end of the first arm portion 11 is connected to a bottom end of the second arm portion 12 with a second joint 14 so that the second arm can swing in a vertical direction with the second joint 14 as a fulcrum. The robot hand 10 is provided with the top end of the second arm 12 with a third joint 15. The robot hand 10 can rotate pivotally around an axis thereof as well as swing along an arbitrary plane on the axis with the third joint 15 as a fulcrum.

As shown in FIGS. 2–5, the robot hand 10 includes a hand base 20 provided with the third joint 15 and a pair of fingers 21, 21 as a grip protruding from the hand base 20 so as to grip or release a workpiece W from both lateral sides. Further, at the center of the hand base 20, an air cylinder for grip 23 is provided for operating gripping or opening movement of the fingers 21, 21.

The air cylinder 23 for grip includes a cylinder 24 as a driving base and a movable core 25 as a movable body provided with the cylinder 24 so as to extend or retract by the air pump 17 as a driving means. The cylinder 24 is fixed on the hand base 20. The movable core 25 gradually moves to the maximum extending position P1 in which the moving distance is the length in a normal state, when supply of driving air is stopped.

The hand base 20 includes two bottom end axes 27, 27 which function as a bearing for the fingers 21, 21 respectively at both lateral sides of the movable core 25 of the air cylinder for grip 23. Each finger 21 is curved toward the center each other. On the bottom end of the fingers 21, 21, an axis hole for fingers 29 is provided to which the base axis 27 is pivotally mounted. Thus, the fingers 21, 21 are mounted on a hand base 20 so as to rotate around a pivot axis, that is, rotating in the gripping and releasing direction.

Each of the opposed fingers 21, 21 has a block nail 31 protruding from the inside respectively at the top and the middle in order to concentrate a gripping force when a workpiece is gripped. A link means 40 for linking extending or retracting movement of the air cylinder for grip 23 with gripping or releasing movement of the fingers 21, 21 is provided between the air cylinder for grip 23 and the fingers 21, 21.

The link means 40 is constituted from a lever 33 protruding from the base of the fingers 21, 21 and a connecting pad 43 for connecting the lever and a movable core 25 of the air cylinder for grip 23. The lever 33 protrudes toward the third joint 15 such that an extending or retracting force of the air cylinder for grip 23 is transferred to the fingers 21, 21. An axis hole for lever 41 is provided at the end of the lever 33. The connecting pad 43 connects the axis hole for lever 41 and an axis hole for movable body 42 provided at the top of the movable core 25.

The link means 40 links an extending and retracting movement of the movable core 25 of the air cylinder for grip 23 with a rotating movement of the fingers 21, 21. That is, by means of the air cylinder for grip 23 using the link means 40, the fingers 21, 21 perform a gripping movement for reducing a gap between the fingers when the movable core 25 retracts. On the other hand, the fingers 21, 21 perform a releasing movement for enlarging a gap between the same when the movable core 25 extends.

Moreover, a workpiece drop prevention means 60 is provided with the hand base 20. The work piece drop prevention means protrudes the protrusion stick 50 by a momentum force of the momentum means when the air pump 17 is stopped. Then, the protrusion stick 50 abuts on the movable core 25 to limit an extending movement of the movable body 25, whereby a gripping state of the workpiece W is maintained since an opening movement of the fingers 21, 21 is stopped using linking means 40. As a result, a drop or an unstable grip of the workpiece can be prevented.

The elements included in the workpiece drop prevention means 60 will be explained below. It has a protrusion stick 50 with a tapered tip and a supporting rail 51 which supports the protrusion stick 50 so that the protrusion stick 50 can slide smoothly between a protrusion position Q1 and a recess position Q2 in protruding and recessing directions. It should be noted that at the protrusion position Q1 the movable core 25 abuts on the protrusion stick 50. In addition, it has two coil springs 52, 52 as a momentum means for supplying momentum with the protrusion stick 50 for protruding to the protrusion position Q1. Lastly, it has an air cylinder for recess 53 as a holding means for holding the protrusion stick 50 recessed at the recess position Q2 resisting the momentum toward a protruding direction of the coil springs 52, 52 in a normal state, and for releasing a holding of the protrusion stick 50 when the air pump 17 is stopped. The above elements are all housed in a frame 8 fixed in the lateral side of the hand base 20. The air cylinder for recess 53 is connected with a branch pipe (not shown) forked from a supply tube 18 so that a grip and release of the protrusion stick 50 can be driven by an driving system which is the same as that of the air pump 17 which drives the movable core 25.

A top portion 50a of the protrusion stick 50 is a plate whose cross section perpendicular to the protruding direction is vertically long rectangular shape. Moreover, an extreme tip of the top portion 50a is tapered. At a tip of the movable core 25 of the above-mentioned air cylinder 23 for grip, an attaching portion 26 is provided having an inclination corresponding to the tapered angle of the top portion 50a of the protrusion stick 50. The air cylinder for recess 53 is constituted from a cylinder 54 which is fixed to the frame 8 and a movable core 55 provided with the cylinder 54 so that the movable core can extend or retract. The movable core 55 is configured so that it immediately moves from a recess portion R2 to the maximum retracting portion R1 in which the moving distance is the length in a normal state when supply of driving air is stopped.

At the bottom end of the protrusion stick 50, an engage slip 56 for engaging the movable core 55 of the air cylinder for recess 53 is provided. Each of the coil springs 52, 52 has one end fixed in the frame 8 and the other end fixed in the outer side of the protrusion stick 50 so that the coil springs are positioned at both outer sides of the protrusion stick 50. The supporting rail 51 is provided at a position where the protrusion stick 50 supported by the supporting rail 51 protrudes in a direction perpendicularly to the extending or retracting direction of the movable core 25 of the air cylinder for grip 23. Moreover, the supporting rail 51 is provided at a position where the top portion 50a abuts on the abutting portion 26 when the protrusion stick 50 protrudes, so that an extending movement of the movable core 25 is prevented.

In a working robot 5 comprising the robot hand 10 including the above-mentioned configuration, a movement of transferring the workpiece W and operation of the workpiece drop prevention means 60 will be described below. When the workpiece drop prevention means 60 is not operated, the air cylinder for recess 53 continues extending movement by means of driving air supplied from the air cylinder 17. Then the engage slip 56 is pressed to the recessing direction reducing the momentum of protruding direction in spite of a resistance of the coil springs 52, 52. Whereby, the protrusion stick 50 is held at the recess position Q2. At this time, the protrusion stick 50 is housed in the frame 8. With such a state, the air cylinder for grip 23 can freely extend or retract by means of a control device (not shown), thereby linking the fingers 21, 21 using linking means 40. As a result, the fingers 21, 21 of the robot hand 10 can grip or release the workpiece W.

When the movable arm 7 is controlled, the robot hand 10 moves to a workpiece to be transferred. Then the movable core 25 of the air cylinder for grip 23 is retracted, which enables the fingers 21, 21 to grip a workpiece W. The gripped workpiece W is transferred to a predetermined position for the next process inverting in a predetermined direction by a vertical movement of the movable arm 7, a turning movement of the robot hand 10, and horizontal rotating movement of the base 6. Then the fingers 21, 21 open to release the workpiece by an extending movement of the movable core 25 of the robot hand 10. Thus, the process of transferring the workpiece W is finished.

When an emergency happens unexpectedly during the process of transferring a workpiece, for example, supply of driving air is stopped from the air pump 17 to robot hand 10, or a pressure of driving air is reduced by a malfunction of the air pump 17 or the supply tube 18, the workpiece drop prevention means 60 operates to release the protrusion stick 50 held by the coil springs 52, 52. At this time, the movable core 25 of the air cylinder for grip 23 is gradually extending as if it returned from the grip position P2 to the maximum extending position P1 in which the moving distance is the length in a normal state. Then the gripping force toward the workpiece W by the fingers 21, 21 starts to decrease since the fingers 21, 21 are connected to the movable core 25 using linking means 40. It should be noted that in a normal state of the workpiece drop prevention means 60, the movable core 55 of the air cylinder for recess 53 extends in the direction that opposes the momentum in spite of a resistance of the coil springs 52, 52. However, in the emergency described above, the movable core 55 of the air cylinder for recess 53 immediately retracts as if it returned from the recess portion R2 to the maximum retracting position R1 in which the moving distance is the length in a normal state because the movable core 55 releases the grip of the protrusion stick 50 when the air pump 17 stops.

By this retracting, the momentum of the coil springs 52, 52 is released and the tapered top portion 50a of the protrusion stick 50 protrudes from recess portion Q2 to protrusion position Q1 in order to attach the attaching portion 26 of the tip of the air cylinder for grip 23 before the gripping force toward the workpiece W is decreased. Due to this protrusion movement of the protrusion stick 50, the movable core 25 of the air cylinder for grip 23 attached to the protrusion stick 50 cannot further extend, whereby, the fingers 21, 21 which are linked with the movable core 25 stop releasing movement. As a result, the robot hand 10 maintains gripping the workpiece and a workpiece drop is prevented.

With this robot hand 10, a momentum of the coil springs 52, 52 is used for simplifying a configuration of the workpiece drop prevention means 60. Also, a move of the movable core 25 is prevented without fail regardless of wear or stain of the top portion 50a of the protrusion stick 50. Therefore, reliability of a drop preventing function of the workpiece drop prevention means 60 is improved.

Further, holding and releasing the protrusion stick 50 by the air cylinder for recess 53 can be driven by a driving system which is the same as the air pump 17 which drives the movable body 25. Consequently, when the air pump 17 is stopped in an emergency such as an electric power failure, releasing movement is stopped before a gripping force toward a workpiece W is decreased, thereby retaining the grip for the workpiece W. As a result, a workpiece drop can be prevented without fail.

Further, a top portion 50a of the protrusion stick 50 is formed to be tapered and the attaching portion 26 corresponding to the tapered angle of the top portion 50a is provided at the top of the movable body 25. Whereby, the momentum for the protrusion stick 50 is distributed to the retracting direction of the movable body 25 and when a workpiece drop prevention means 60 is operated, a workpiece gripping force by the fingers 21, 21 can be further improved. Moreover, the momentum distributed in the retracting direction of the movable body 25 can be converted to a suitable gripping force according to the angle of a tapered tip.

Also, a grip is consisted of a pair of fingers 21, 21 pivotally engaged to the hand base 20, and a gripping and releasing movement is performed at both lateral sides of the workpiece by rotating the fingers 21, 21 about the pivot axis. By doing this, the hand base 20 can be made more compact because the width of a workpiece gripping portion is narrower than that of a pivot axis portion. As a result, the overall size of a robot hand can be more compact compared with the conventional ones.

The link means 40 is configured so that a lever 33 of the fingers 21, 21 and the tip of the movable body 25 are connected using the connecting pad 43. With this configuration, a necessary moving area of the lever 33 for rotating pivotally can be smaller by shortening the length of the lever 33 which protrudes from the base. Moreover, due to leverage, the extending or retracting distance of the movable body 25 of the air cylinder for grip 23 can be shortened while the fingers 21, 21 gain a large gripping force. Thus, the overall size of the robot hand 10 can be downsized because the link means 40's moving area can be smaller.

The above description of the embodiment of the present invention has in no way been provided for the purpose of limiting the present invention, and it is of course possible to diversely embody the present invention by changing the figure or configuration within the scope not departing from the essential points of the present invention as described before.

(1) This invention is not limited to the robot hand 10, and may be used in other workpiece gripping apparatus for processing device or transfer device.
(2) A driving means and gripping means are not limited to the air cylinder, and a hydraulic cylinder or a solenoid may be used.
(3) The top portion 50a of the protrusion stick 50 may have a cylinder whose cross section perpendicular to the protruding direction is a circle, or a polygonal pillar whose cross section perpendicular to the protruding direction is square or triangle or hexagon etc., and each extreme tip of the above is tapered.
(4) The movable body provided with the driving base is not limited to the movable core 25 provided with the cylinder 24, and may be configured with a rack driven by a pinion.
(5) The gripping means is not limited to the movable core 55 provided with the cylinder 54, and may be configured with a rack driven by a pinion.
(6) The fingers 21, 21 are not limited one pair, and may be plural pairs as long as the workpiece is gripped from both lateral sides.
(7) The shape of the fingers 21, 21 can be diversely shaped such as an oblong plate as long as it corresponds to the shape of a workpiece to be gripped.
(8) The workpiece drop prevention means 60 may operate not only in an emergency such as the time when the air pump 17 is stopped, but in an arbitrary situation. For example, a user can operate an operation switch, in arbitrary occasions, by providing the operation switch between an air pump 17 and a robot hand 10.
(9) The momentum means is not limited to a coil spring 52 and may be other elastic body such as a plate spring. In addition, the number of momentum means is not limited to two or other numbers, for example one or three, is acceptable.
(10) The working robot 5 is provided with a machine tool such as a machining center. It may be used, for example, to transfer a workpiece from a certain position of the previous process to a certain position of the next process.

As described above, according to a first aspect of the present invention, the configuration of a workpiece drop prevention means can be simplified. Moreover, extending of the movable body can be prevented without fail. Therefore, reliability of the drop-prevention function of the workpiece drop prevention means can be improved.

According to a second aspect of the present invention, when the driving means is stopped in emergency such as an electric power failure, a workpiece drop prevention means is operated as soon as a gripping force toward the workpiece W starts to decrease. Consequently, the releasing operation of the workpiece drop prevention means is stopped before the gripping force decreases. As a result, the robot hand 10 retains a grip of the workpiece and a workpiece drop is prevented without fail.

According to a third aspect of the present invention, the width of a workpiece gripping portion can be narrower than that of a pivot axis portion, so that a gripping base can be made more compact. As a result, the overall size of a robot hand can be smaller compared with the conventional ones.

According to a fourth aspect of the present invention, a necessary moving area of the lever for rotating pivotally can be smaller by shortening the length of the lever which protrudes from the base. Moreover, the extending or retracting distance of the movable body can be shortened while the fingers 21, 21 gain a large gripping force. Thus, the overall size of a workpiece gripping device can be downsized with a small moving area of the link means.

What is claimed is:

1. A hand device for working robot comprising:
   a grip capable of gripping or releasing a workpiece;
   a movable body provided on a driving base so as to extend or retract by a driving means;
   a link means for linking an extending or retracting movement of the movable body with a gripping or releasing movement of the grip; and
   a workpiece drop prevention means for preventing a workpiece from dropping by attaching to the movable body to stop the releasing movement of the grip when the driving means is stopped,
   wherein the workpiece drop prevention means further comprises a protrusion stick with a tapered tip, a support rail supporting the protrusion stick so as to slide the protrusion stick between a protrusion position wherein the protrusion stick abuts the movable body and a retracted position wherein the protrusion stick is free from contacting the moveable body, a momentum means for pushing the protrusion stick supported by the support rail at the protrusion position, and a holding means for holding the protrusion stick at the retracted position resisting against the pushing of the momentum means in a normal state and for releasing the protrusion stick when the driving means is stopped operating.

2. A hand device for working robot according to claim 1, wherein the holding means controls gripping and releasing the protrusion stick by the driving means of the movable body.

3. A hand device for working robot according to claim 1, wherein the grip has at least a pair of fingers mounted pivotally on the gripping base and movement of gripping and releasing the workpiece are performed from both lateral sides of the workpiece by rotating the fingers around a pivot axis.

4. A hand device for working robot according to claim 2, wherein the grip comprising at least a pair of fingers mounted pivotally on the gripping base and movement of gripping and releasing the workpiece is performed from both lateral sides of the workpiece by rotating the fingers around a pivot axis.

5. A hand device for working robot according to claim 3, wherein the link means includes a lever protruding from the base of the fingers and a connecting pad for connecting the lever and the movable body, and an extending and retracting movement of the movable body is linked with a rotating movement of the fingers.

6. A hand device for working robot according to claim 4, wherein the link means includes a lever protruding from the base of the fingers and a connecting pad for connecting the lever and the movable body, and an extending and retracting movement of the movable body is linked with a rotating movement of the fingers.

* * * * *